United States Patent
Miller et al.

(10) Patent No.: US 8,695,705 B2
(45) Date of Patent: Apr. 15, 2014

(54) COMPOSITE FORMULATIONS AND METHODS OF MAKING AND USING SAME

(75) Inventors: Matt Lynn Miller, Spring, TX (US); Jay Paul DeVille, Spring, TX (US); John Walter Sherman, Houston, TX (US); Samuel Jason Lewis, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 203 days.

(21) Appl. No.: 13/253,685

(22) Filed: Oct. 5, 2011

(65) Prior Publication Data

US 2013/0087332 A1   Apr. 11, 2013

(51) Int. Cl.
    E21B 33/13    (2006.01)
(52) U.S. Cl.
    USPC .................. 166/295; 166/300; 166/305.1
(58) Field of Classification Search
    None
    See application file for complete search history.

(56) References Cited

U.S. PATENT DOCUMENTS

| | | | |
|---|---|---|---|
| 3,256,219 A | 6/1966 | Will | |
| 3,371,712 A | 3/1968 | Adams | |
| 3,437,619 A | 4/1969 | Nutt | |
| 3,926,886 A | 12/1975 | Kelley et al. | |
| 3,981,835 A | 9/1976 | van Dyke | |
| 4,015,991 A | 4/1977 | Persinski et al. | |
| 4,115,336 A | 9/1978 | Crouzet | |
| 4,204,988 A | 5/1980 | Crouzet | |
| 4,303,768 A | 12/1981 | Blount | |
| 4,426,243 A | 1/1984 | Briggs | |
| 4,504,318 A | 3/1985 | Matsuda et al. | |
| 4,515,635 A | 5/1985 | Rao et al. | |
| 4,522,953 A | 6/1985 | Barby et al. | |
| 4,555,269 A | 11/1985 | Rao et al. | |
| 4,676,317 A | 6/1987 | Fry et al. | |
| 4,676,832 A | 6/1987 | Childs et al. | |
| 4,703,801 A | 11/1987 | Fry et al. | |
| 5,314,022 A | 5/1994 | Cowan et al. | |
| 5,339,903 A | 8/1994 | Eoff et al. | |
| 5,346,012 A | 9/1994 | Heathman et al. | |
| 5,492,177 A | 2/1996 | Yeh et al. | |
| 5,588,488 A | 12/1996 | Vijn et al. | |
| 5,658,380 A | 8/1997 | Dillenbeck, III | |
| 5,875,844 A | 3/1999 | Chatterji et al. | |
| 5,875,845 A | 3/1999 | Chatterji et al. | |
| 5,945,387 A | 8/1999 | Chatterji et al. | |
| 6,068,055 A | 5/2000 | Chatterji et al. | |
| 6,268,406 B1 | 7/2001 | Chatterji et al. | |
| 6,271,181 B1 | 8/2001 | Chatterji et al. | |
| 6,328,106 B1 | 12/2001 | Griffith et al. | |
| 6,401,817 B1 | 6/2002 | Griffith et al. | |
| 6,448,206 B1 | 9/2002 | Griffith et al. | |
| 6,457,524 B1 | 10/2002 | Roddy | |
| 6,503,870 B2 | 1/2003 | Griffith et al. | |
| 6,508,305 B1 | 1/2003 | Brannon et al. | |
| 6,508,306 B1 | 1/2003 | Reddy et al. | |
| 6,555,507 B2 | 4/2003 | Chatterji et al. | |
| 6,702,044 B2 | 3/2004 | Reddy et al. | |
| 6,749,682 B2 | 6/2004 | Mattus | |
| 6,823,940 B2 | 11/2004 | Reddy et al. | |
| 6,837,316 B2 | 1/2005 | Reddy et al. | |
| 6,848,519 B2 | 2/2005 | Reddy et al. | |
| 6,881,708 B2 | 4/2005 | Reddy et al. | |
| 7,077,203 B1 | 7/2006 | Roddy et al. | |
| 7,143,828 B2 | 12/2006 | Reddy et al. | |
| 7,174,962 B1 | 2/2007 | Roddy et al. | |
| 7,259,130 B2 | 8/2007 | Griffith et al. | |
| 7,267,169 B2 | 9/2007 | Powell et al. | |
| 7,297,662 B2 | 11/2007 | Verret | |
| 7,488,705 B2 | 2/2009 | Reddy et al. | |
| 7,762,329 B1 | 7/2010 | Morgan et al. | |
| 7,810,561 B2 | 10/2010 | Lee | |
| 7,870,903 B2 | 1/2011 | Fang et al. | |
| 8,474,532 B2 | 7/2013 | Ballard | |
| 2009/0158970 A1 | 6/2009 | Andersen et al. | |
| 2010/0163228 A1* | 7/2010 | Abad et al. | 166/270.1 |
| 2012/0006545 A1 | 1/2012 | Shirshova et al. | |
| 2012/0010324 A1 | 1/2012 | Shirshova et al. | |

FOREIGN PATENT DOCUMENTS

WO   2012004569 A1   1/2012
WO   2013052282 A1   4/2013

OTHER PUBLICATIONS

Foreign communication from a related counterpart application—International Search Report and Written Opinion, PCT/US2012/056314, Dec. 5, 2012, 12 pages.
Office Action dated Jul. 24, 2012 (26 pages), U.S. Appl. No. 12/833,030, filed on Jul. 9, 2010.
Office Action dated Oct. 4, 2012 (26 pages), U.S. Appl. No. 12/833,032, filed on Jul. 9, 2010.
Office Action (Final) dated Jul. 26, 2012 (29 pages), U.S. Appl. No. 12/833,032, filed on Jul. 9, 2010.
Office Action dated Jan. 18, 2012 (22 pages), U.S. Appl. No. 12/833,032, filed on Jul. 9, 2010.
Zhihong, Wang, et al., "Research on increasing effect of solution polymerization for cement-based composite," Cement and Concrete Research, 2003, pp. 1655-1658, vol. 33, Elsevier Ltd.
Foreign communication from a related counterpart application—International Search Report and Written Opinion, PCT/GB2011/001030, Oct. 26, 2011, 10 pages.
Foreign communication from a related counterpart application—International Preliminary Report on Patentability, PCT/GB2011/001030, Jan. 15, 2013, 8 pages.
Office Action dated May 20, 2013 (18 pages), U.S. Appl. No. 12/833,030, filed Jul. 9, 2010.

(Continued)

Primary Examiner — Zakiya W Bates
(74) Attorney, Agent, or Firm — Craig Roddy; Conley Rose, P.C.

(57) ABSTRACT

A method of servicing a wellbore comprising placing a composition comprising an emulsified resin composite into a fluid loss zone of the wellbore, wherein the emulsified resin composite comprises a nonaqueous external phase (NEP) and an aqueous internal phase (AIP), and allowing the composition to cure to form a composite material.

21 Claims, No Drawings

(56) References Cited

OTHER PUBLICATIONS

Office Action (Final) dated Jan. 15, 2013 (22 pages), U.S. Appl. No. 12/833,030, filed, Jul. 9, 2010.
Office Action dated Jun. 20, 2013 (34 pages), U.S. Appl. No. 12/833,032, filed Jul. 9, 2010.
Advisory Action dated May 9, 2013 (7 pages), U.S. Appl. No. 12/833,032, filed Jul. 9, 2010.
Office Action (Final) dated Mar. 1, 2013 (26 pages), U.S. Appl. No. 12/833,032, filed Jul. 9, 2010.
Office Action dated Oct. 10, 2013 (23 pages), U.S. Appl. No. 12/833,030, filed Jul. 9, 2010.

* cited by examiner

COMPOSITE FORMULATIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

The present disclosure generally relates to wellbore servicing. More specifically, this disclosure relates to the use of composite compositions to reduce lost circulation.

2. Background

A natural resource such as oil or gas residing in a subterranean formation can be recovered by drilling a well into the formation. The subterranean formation is usually isolated from other formations using a technique known as well cementing. Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. That is, a viscous fracturing fluid may pumped down the casing to the formation at a rate and a pressure sufficient to form fractures that extend into the formation, providing additional pathways through which the oil or gas can flow to the well. Unfortunately, water rather than oil or gas may eventually be produced by the formation through the fractures therein. To provide for the production of more oil or gas, a fracturing fluid may again be pumped into the formation to form additional fractures therein. However, the previously used fractures first must be plugged to prevent the loss of the fracturing fluid into the formation via those fractures.

In addition to the fracturing fluid, other fluids used in servicing a wellbore may also be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

Conventional methods of treating lost circulation take into consideration many aspects related to the type of wellbore servicing operation being carried out. One challenge that may be encountered in the utilization of lost circulation treatments is the use of water-wet or hydrophilic materials to treat formations that are oil-wet. For example, a lost circulation zone may be encountered when drilling with an oil-based mud (OBM). In such instances, the OBM has rendered the formation or environment (e.g., wellbore) oil-wet where the formation or environment contains materials that are oleaginous in nature (e.g., surface of the formation or environment has oleaginous-type residual material). In such instances the use of conventional methods of treating lost circulation (e.g., cement plugs) are less effective due to the ability of the oil-wet material to retard setting of the cement and due to the poor bonding that typically results between the water-based cement and oil-wet formation. These challenges are often addressed by the time-consuming and costly conversion of the oil-wet formation or environment to a water-wet formation or environment before introduction of the cement plug.

Accordingly, an ongoing need exists for compositions and methods of treating lost circulation. Additionally an ongoing need exists for compositions and methods of treating lost circulation in oil-wet formations or environments.

SUMMARY

Disclosed herein is a method of servicing a wellbore comprising placing a composition comprising an emulsified resin composite into a fluid loss zone of the wellbore, wherein the emulsified resin composite comprises a nonaqueous external phase (NEP) and an aqueous internal phase (AIP), and allowing the composition to cure to form a composite material.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are compositions and methods for the treatment of lost circulation. In an embodiment, the composition comprises a composite material comprising a cementitious material and a polymeric material. In an embodiment the composite material is prepared as an emulsion comprising an aqueous internal phase (e.g., a cement slurry) and a nonaqueous external phase (e.g., a polymer and/or polymerizable material) which is hereinafter termed the emulsified resin composite (ERC). Herein an emulsion refers to a mixture of two immiscible liquids of which one is in dispersed form and the other is in the continuous form. Herein "composite materials" refer to materials which are made from two or more constituent materials (e.g., a cementitious material and a polymeric material) with significantly different physical and/or chemical properties and which remain separate and distinct on a macroscopic level within the finished structure. The ERC may be introduced to a formation experiencing lost circulation and then form a composite material (e.g., set material) that reduces and/or eliminates the loss of fluids to one or more loss circulation zones. Formation of the composite material from the ERC may involve reactions that result in the development of a solid mass having an appreciable compressive strength. Such reactions will be described in more detail later herein. Hereinafter the ERC after having reacted to form a solid mass is termed a composite material for treatment of lost circulation (COMP).

In an embodiment the ERC comprises a non-aqueous external phase (NEP) and an aqueous internal phase (AIP). The ratio of NEP to AIP, also termed the oil-water ratio (OWR), may be varied to meet one or more user and/or process needs. In an embodiment, the OWR is from about 5:95 to about 50:50 volume:volume; alternatively, from about 20:80 to about 50:50; or alternatively from about 30:70 to about 50:50.

In an embodiment, the AIP comprises a cementitious material. In an embodiment, the AIP is a cement slurry comprising cementitious material, water, and optionally one or more additives. Any cementitious material suitable for use in subterranean well cementing operations may be included in the AIP. The cementitious material may be a hydraulic cement comprising calcium, aluminum, silicon, oxygen, and/or sulfur. Nonlimiting examples of cementitious materials suitable for use in this disclosure include Portland cements (e.g., classes A, C, G, and H Portland cements), construction cements (e.g., type I and II), pozzolanic cements, gypsum cements, shale cements, acid/base cements, phosphate cements, high alumina content cements, silica cements, high alkalinity cements, magnesia cements, fly ash cement, zeolite cement systems, cement kiln dust cement systems, slag cements, micro-fine cement, metakaolin, Sorel cement which typically comprises magnesium oxide and a chloride or phosphate salt which together form for example magnesium oxychloride, or combinations thereof. In an embodiment, the cementitious material is selected from the group consisting of Portland cement, construction cement, pozzolanic cement, gypsum cement, shale cement, acid/base cement, phosphate cement, high alumina content cement, silica cement, high alkalinity cement, magnesia cement, fly ash cement, a zeolite cement system, a cement kiln dust cement system, slag cement, micro-fine cement, metakaolin, Sorel cement, and a combination thereof.

Other examples of cements suitable for use in this disclosure are disclosed in U.S. Pat. Nos. 6,457,524; 7,077,203; and 7,174,962, each of which is incorporated herein by reference in its entirety. The cementitious material may be present in the AIP in an amount of from about 60 wt. % to about 99 wt. % based on the total weight of solids, alternatively from about 70 wt. % to about 99 wt. %, or alternatively from about 80 wt. % to about 99 wt. %.

In an embodiment, water is present in the AIP. The water utilized in the AIP may include fresh water, salt water (e.g., water containing one or more salts dissolved therein), or seawater. Generally, the water may be from any source provided that it does not contain an excess of compounds that adversely affect other components in the ERC. In an embodiment, water is present in the AIP in an amount in the range of from about 20 wt. % to about 40 wt. % by weight of cement, alternatively from about 25 wt. % to about 40 wt. %, or alternatively from about 25 wt. % to about 35 wt. %.

In some embodiments, additives may be included in the AIP for improving or changing the properties of the cementitious component of the ERC and/or COMP. Examples of such additives include but are not limited to, defoamers, foaming surfactants, dispersants, vitrified shale and other fillers such as silica flour, sand and slag, hollow glass or ceramic beads, mechanical property modifying additives, for example, elastomers, or combinations thereof. These additives may be included singularly or in combination. Methods for introducing these additives and their effective amounts are known to one of ordinary skill in the art with the aid of this disclosure.

In an embodiment the NEP comprises at least one polymer, at least one polymerizable material, or combinations thereof. In an embodiment, the NEP comprises a polymerizable material that is compatible with an oleaginous fluid. Herein compatibility of the polymerizable material with oleaginous fluids refers to the polymerizable material being at least miscible with the oleaginous fluid. In an embodiment, the NEP comprises a polymerizable material that polymerizes in situ within the wellbore to form a polymer, the polymer being a component of the composite material.

In an embodiment, a polymerizable material suitable for use in the NEP is a monomer or combination of two or more monomers (e.g., two monomers yielding a copolymer, three monomer yielding a terpolymer, etc.) that is characterized by the ability to resist degradation at typical wellbore servicing temperatures which range from about 80° F. to about 350° F., alternatively from about 100° F. to about 350° F., or alternatively from about 150° F. to about 350° F. Herein "resist degradation" refers to the ability of the monomer to maintain structural features and reactivity characteristic of the monomer. Further, a monomer suitable for use in the present disclosure may be characterized as having a low volatility. Herein a low volatility monomer is one having a boiling point of greater than about 150° F., alternatively greater than about 160° F., or alternatively greater than 165° F. and a flash point greater than about 110° F., alternatively greater than about 115° F., or alternatively greater than about 120° F.

As will be understood by one of ordinary skill in the art, the suitability of a monomer for use in the NEP will also be dependent on the effect of the monomer on the AIP and in particular on the extent to which the NEP affects the time for the cementitious material (e.g., cement slurry) to form a set cement. Monomers suitable for use in this disclosure will increase the set time of the AIP by less than about 10%, alternatively less than about 5%, or alternatively less than about 1%. Herein the set time refers to the period of time needed for the AIP to obtain a compressive strength of greater than about 250 psi after it is introduced to the lost circulation zone.

In an embodiment, the monomer comprises a vinylaromatic monomer; alternatively the monomer comprises styrene. Styrene, also known as vinyl benzene, ethenylbenzene, and phenylethene is an organic compound represented by the chemical formula $C_8H_8$.

Nonlimiting examples of monomers suitable for use in the present disclosure include substituted styrenes. For example the monomer may comprise para-methylstyrene, t-butylstyrene, alpha-methylstyrene, isomers thereof, or combinations thereof. In an embodiment, the monomer comprises a material characterized by general structure A or B:

Structure A

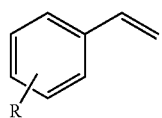

Structure B where R is an alkyl group, an aryl group, an alkenyl group, a halide group, an —OR group, an —$NR_2$ group, or a —$PR_2$ group.

In an embodiment, the monomer is present in the NEP in an amount of from about 20 volume percent (vol. %) to about 60 vol. %; alternatively from about 30 vol. % to about 50 vol. %; or alternatively about 40 vol. % based on the total volume of the NEP.

In an embodiment, a crosslinker suitable for use in the NEP is any material that functions to link polymer chains of the polymerizable material (e.g., monomer) together and is compatible with the other components of the ERC. In an embodiment, a crosslinker suitable for use in the NEP is a low volatility material having a boiling greater than about 150° F., alternatively greater than about 160° F., or alternatively greater than 165° F. and a flash point greater than about 110° F., alternatively greater than about 115° F., or alternatively greater than about 120° F.

In an embodiment, the crosslinker comprises divinylbenzene. Alternatively, the crosslinker comprises a material with a volatility that is less than that of divinylbenzene. Nonlimiting examples of crosslinkers suitable for use in this disclosure include diisopropylbenzene, trimethyolpropane triacrylate, pentaerythritol tetraacrylate, or combinations thereof. In an embodiment, the crosslinker is present in the NEP in an amount of from about 0.1 mole percent (mol. %) to about 5 mol. %; alternatively from about 0.5 mol. % to about 5 mol. %; or alternatively about 0.5 mol. % to about 2 mol. % based on the total moles of polymerizable groups.

In an embodiment, the NEP comprises an optional initiator. Initiators, sometimes referred to as accelerators, are compounds that function as the source of free radicals to enable polymerization of the polymerizable material (e.g., one or more monomers). In an embodiment, any initiator capable of free radical formation that facilitates the polymerization of the monomer and is compatible with the other components of the NEP and ERC may be employed. An initiator suitable for use in this disclosure may be chosen based on its activity at a particular temperature as indicted by the initiator half-life ($t_{1/2}$) which is the time required to reduce the original initiator content of a solution by 50%, at a given temperature. For example, the initiator may have a $t_{1/2}$ of from about 4 hours to about 8 hours, alternatively from about 4.5 hours to about 7.5 hours, or alternatively from about 5 hours to about 7 hours.

Nonlimiting examples of initiators suitable for use in the present disclosure include organic peroxides, azo-initiators, diacyl peroxides, peroxydicarbonates, monoperoxycarbonates, peroxyketals, peroxyesters, dialkyl peroxides, hydroperoxides, or combinations thereof. In an embodiment the initiator comprises 2,2'-azobis(4-methoxy-2,4-dimethylvaleronitrile), 2,2'-azobis(2,4-dimethylvaleronitrile), 2,2'-azobisisobutyronitrile (AIBN), dimethyl 2,2'-azobisisobutyrate, 2,2'-azobis(2-methylbutyronitrile), 1,1'-azobis(1-cyclohexanecarbonitrile), 2-(carbamoylazo)isobutyronitrile, 2,2'-azobis(2,4,4-trimethylpentane), 2-phenylazo-2,4-dimethyl-4-methoxyvaleronitrile, 2,2'-azobis(2-methylpropane), benzoyl peroxide, 2,2,-bis(tert-butylperoxy)butane, 1,1-bis(tert-butylperoxy)cyclohexane, 2,5-bis(tert-butylperoxy)-2,5-dimethyl-3-hexyne, bis(1-(tertbutylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,3,-pentanedione peroxide, peracetic acid, potassium persulfate, or combinations thereof.

The selection of initiator and effective amount will depend on numerous factors (e.g., half-life, temperature, reaction time) and can be chosen by one skilled in the art with the benefits of this disclosure to meet the needs of the process. In an embodiment, the initiator may be present in the NEP in an amount of from about 0.05 mol. % to about 5 mol. %, alternatively from about 0.1 mol. % to about 4 mol. %, or alternatively from about 0.1 mol. % to about 1 mol. % based on the total moles of polymerizable groups.

As will be understood by one of ordinary skill in the art, polymerization of the aforementioned monomers may occur in the absence of an initiator and consequently in some embodiments the NEP excludes an initiator. In such embodiments, the rate of polymerization of the monomer and crosslinker in the absence of an initiator may occur on a timescale compatible with the needs of the process. In the alternative, the rate of polymerization of the monomers and crosslinkers in the absence of an initiator may be accelerated to meet some process objective by the introduction of thermal energy to the ERC. The thermal energy may be provided to the ERC by one or more user devices designed to transfer heat to a material and/or from the surrounding environment (e.g., a subterranean formation having a lost circulation zone).

In an embodiment, the ERC comprises an emulsifier, for example the NEP and/or AIP components may comprise an emulsifier. In an embodiment, the NEP comprises an emulsifier. Herein an emulsifier refers to a substance which stabilizes an emulsion. Any emulsifier compatible with the components of the NEP and AIP are suitable for use in the present disclosure. Nonlimiting examples of emulsifiers that may be employed in the present disclosure include any surfactant suitable for forming water-in-oil emulsions such as anionic surfactants (e.g., alkyl sulfates or carboxylates) or non-ionic surfactants (e.g., ethoxylated alcohols). In an embodiment the emulsifier comprises HYPERMER 2296 which is a polymeric surfactant commercially available from Uniqema.

In an embodiment the emulsifier is present in the NEP in an amount of from about 0 to about 20 vol. %, alternatively from about 1 vol. % to about 20 vol. %, alternatively from about 5 vol. % to about 15 vol. %, or alternatively about 15 vol. % based on the total volume of the NEP.

In an embodiment, the nonaqueous fluid present in the NEP is provided by the polymerizable material, crosslinker, emulsifier, and optional initiator. In such embodiments, the NEP is substantially free of or excludes nonaqueous fluids provided by sources other than that of the polymerizable material, crosslinker, emulsifier and optional initiator. Herein substantially free of refers to less than about 20 volume percent of the NEP comprises a nonaqueous fluid other than that attributable to the polymerizable material, crosslinker, emulsifier or optional initiator. Alternatively less than about 15, 10, 5, 1, or 0.1 vol. % of the NEP comprises a nonaqueous fluid other than that attributable to the polymerizable material, crosslinker, emulsifier or optional initiator.

The ERC may be prepared using any suitable methodology. For example, the ERC may be prepared by independently preparing the NEP and AIP and then combining the two compositions to form an ERC at an OWR within the ranges disclosed herein. The ERC may then be placed into a wellbore and allowed to form a COMP. Without wishing to be limited by theory, formation of the COMP can occur in two stages wherein the NEP reacts first followed by reaction of the AIP. Herein, reaction of the NEP refers to polymerization of the monomer and formation of a crosslinked external phase. The time period for reaction of the NEP may range from about 4 hours to about 18 hours, alternatively from about 6 hours to about 18 hours, or alternatively from about 8 hours to about 16 hours. Polymerization of the NEP may be accelerated by the presence of an initiator which is chosen to provide sufficient reactivity based on various process considerations and/or through contacting of the NEP with thermal energy such as supplied by the user and/or the subterranean formation. In an embodiment, the NEP is formulated such that formation of the crosslinked external phase occurs in a time frame consistent with some user and/or process need.

Herein reaction of the AIP refers to setting of the cementitious material via reaction of the hydraulic cement with the aqueous components of the AIP. The time period for setting of the AIP may range from about 12 hours to about 24 hours, alternatively from about 14 hours to about 24 hours, or alternatively from about 16 hours to about 24 hours. Setting of the AIP may be adjusted through the use of conventional set accelerators and/or set retarders. In an embodiment, the AIP is formulated such that formation of the set AIP occurs in a time frame consistent with some user and/or process need.

The ERC having both a polymerized NEP and set AIP is referred to as the COMP. Hereinafter for simplicity the COMP is said to have been formed from curing of the ERC wherein curing of the ERC encompasses both polymerization of the NEP and setting of the AIP.

Without wishing to be limited by theory the COMP may have an architecture characterized by a porous polymer structure that acts as a scaffold for the cementitious material, holding the cementitious material in place until the cementitous material eventually sets. After the final setting of the cement, the resulting composition may include two interpenetrating networks: a network of a porous polymer structure containing a network of set cement. After setting, the resulting composition may include multiple non-continuous networks of set cement disposed within the polymer structure. In an aspect, the resulting composition may include a continuous network of set cement disposed within the polymer structure.

In an embodiment, the ERCs of this disclosure are characterized by a plastic viscosity and yield point that has been adjusted to be comparable to the plastic viscosity and yield point of the drilling fluid utilized in the wellbore servicing operation. The plastic viscosity is an absolute flow property indicating the flow resistance of certain types of fluids and is a measure of shearing stress while the yield point refers to the resistance of the ERC to initial flow, or represents the stress required to start fluid movement.

The ERC when cured forms a COMP having a compressive strength of from about 200 psi to about 2500 psi, alternatively from about 400 psi to about 2500 psi, or alternatively from about 1000 psi to about 2500 psi. Herein the compressive strength is defined as the capacity of a material to withstand axially directed pushing forces. The maximum resistance of a material to an axial force is determined in accordance with API Recommended Practices 10B-2, First Edition, July 2005.

The ERCs as disclosed herein may be used as wellbore servicing fluids. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids, all of which are well known in the art.

In an embodiment, a method of servicing a wellbore may comprise introduction of an ERC of the type described herein to a subterranean formation experiencing lost circulation. It is to be understood that "subterranean formation" encompasses both areas below exposed earth and areas below earth covered by water such as ocean or fresh water.

The ERCs of this disclosure when placed in a lost circulation zone cure to produce a permanent plug (i.e., COMP) that is flexible, adhesive, and of appreciable compressive strength.

The ERC may be introduced to the wellbore to prevent the loss of aqueous or non-aqueous drilling fluids into lost circulation zones such as voids, vugular zones, and natural or induced fractures while drilling. In an embodiment, the ERC is placed into a wellbore experiencing lost circulation and cures to from a COMP having an appreciable compressive strength. The COMP may form a barrier that substantially seals lost circulation zones. In such an embodiment, the ERC may be placed downhole through the drill bit forming a composition that substantially eliminates the lost circulation. The ERC may cure to form a COMP which is a non-flowing, intact mass inside the lost circulation zone which plugs the zone and inhibits loss of subsequently pumped drilling fluid, which allows for further drilling. It is to be understood that it may be desired to hasten the curing of the ERC for swift plugging of the voids. Alternatively, it may be desired to prolong or delay the curing of the ERC for deeper penetration into the voids. For example the ERC may form a mass (e.g., COMP) that plugs the zone at elevated temperatures, such as those found at higher depths within a wellbore.

In an embodiment, the ERC may be employed in well completion operations such as primary and secondary cementing operations. The ERC may be placed into an annulus of the wellbore and allowed to cure such that it isolates the subterranean formation from a different portion of the wellbore. The ERC when cured into a COMP forms a barrier that prevents fluids in that subterranean formation from migrating into other subterranean formations.

In secondary cementing, often referred to as squeeze cementing, the ERC may be strategically positioned in the wellbore where it cures to form a COMP that functions to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

The ERCs of this disclosure may be introduced to a wellbore having lost circulation zones and cure to form a COMP which provides lost circulation control in a sufficiently short time period to prevent the operator from pulling out of the hole and thus reducing nonproductive rig time.

In an embodiment, the ERCs disclosed herein may be introduced to a substantially oil-wet formation experiencing lost circulation and reduce and/or eliminate the loss of fluids to the lost circulation zones. The ERCs of this disclosure may be advantageously introduced to an oil-wet or substantially oil-wet formation or environment without the need for conversion of the formation or environment to a water-wet state. Herein an "oil-wet" or "substantially oil-wet" formation or environment refers to a formation or environment (e.g., wellbore) that has been exposed to one or more oleaginous fluids such that greater than about 50%, 60%, 70%, 80%, or 90% of the residue present on the surface of the formation or environment, originating from the wellbore servicing fluids employed, is oleaginous in nature. Oleaginous fluids herein refer to oil-based drilling or servicing fluids, invert emulsions, servicing fluids comprising substantially no aqueous component, and the like. Examples of the oleaginous fluids include without limitation olefins, internal olefin based oils, mineral oil, kerosene, diesel oil, fuel oil, synthetic oil, linear or branched paraffins, esters, acetals, mixtures of crude oil, derivatives thereof, or combinations thereof.

An ERC of this disclosure when introduced to an oil-wet or substantially oil-wet formation or environment may display a reduction in plastic viscosity of from about 0 to about 25%, alternatively from about 1% to about 25%, or alternatively from about 5% to about 20% when compared to the ERC prior to introduction to an oil-wet or substantially oil-wet formation or environment. An ERC of this disclosure when introduced to an oil-wet or substantially oil-wet formation or environment may display a reduction in yield point of from about 0% to about 50%, alternatively from about 5% to about 45%, or alternatively from about 10% to about 40% when compared to the ERC prior to introduction to an oil-wet or substantially oil-wet formation or environment. In an embodiment, a ERC of the type described herein when contacted with an oleaginous fluid forms a COMP having a compressive strength of equal to or greater than about 250 psi, alternatively equal to or greater than about 500 psi, or alternatively equal to or greater than about 750 psi. In an embodiment, the ERCs disclosed herein may be rheologically tuned by adjustment of the OWR or the monomer/cross-linker ratio. For example, increasing the amount of cross-linker may increase the viscosity of the composition whereas increasing the OWR may decrease the viscosity of the ERC. Additional modifications or methods of fine tuning the rheology of the ERC would be apparent to one of ordinary skill in the art with the benefits of this disclosure.

EXAMPLES

Example 1

A composition, designated Sample 1, was prepared using the starting formulation set forth in Table 1.

TABLE 1

| Sample | 1 |
|---|---|
| OWR | 20:80 |
| Styrene, mL | 24 |
| Divinylbenzene, mL | 24 |
| HYPERMER 2296, mL | 12 |
| AIBN[1], g | 0.54 |
| 0.5% CaCl$_2$ aq. Solution | 20 |
| Water, mL | 120 |
| Class A Cement, g | 320 |
| Compressive strength, psi | 500[2] |
| Electrical Stability, V | 40 |

[1]azobisisobutyronitrile
[2]subsequent remakes had compressive strengths of 450 and 525 psi The materials were mixed together and cured in a cube mold at 160° F. for 24 hours. The external phase of the set material was composed of styrene and divinylbenzene. AIBN served as a radical polymerization initiator and HYPERMER 2296 polymeric surfactant functioned as the emulsifier. As can be seen by the compressive strength measurement, the sample set to form a hardened, cement-like solid. The electrical stability is generally a measure of the emulsion strength and is measured in accordance with API Recommended Practice 13B-2, 4$^{th}$ Edition March 2008. An electrical stability of greater than zero indicates that the emulsion is oil-external which is a consideration when placing the emulsion in an oil-wet formation.

The effect of varying the OWR and type of initiator on the compressive strength was investigated. Five compositions designated Samples 2 to 6, were prepared and contained materials similar to those listed for Sample 1 with the exceptions as indicated in Table 2.

TABLE 2

| Sample | 1 | 2 | 3 | 4 | 5 | 6 |
|---|---|---|---|---|---|---|
| OWR | 20/80 | 30/70 | 20/80 | 30/70 | 20/80 | 30/70 |
| Styrene, mL | 24 | 18 | 12 | 18 | 12 | 36 |
| Divinyl Benzene, mL | 24 | 18 | 12 | 18 | 12 | 36 |
| Hypermer 2296, mL | 12 | 6 | 6 | 6 | 6 | 12 |
| AIBN, g | 0.54 | 0.4 | — | — | — | — |
| Benzoyl Peroxide, g | — | — | 0.4 | 0.6 | — | — |
| Lauroyl Peroxide, g | — | — | — | — | 0.66 | 1.94 |
| 0.5% CaCl$_2$ solution, mL | 20 | 8.75 | 10 | 8.75 | 10 | 17.5 |
| Tap water, mL | 120 | 52.5 | 60 | 52.5 | 60 | 105 |
| Class A cement, g | 320 | 140 | 160 | 140 | 160 | 280 |
| Compressive Strength, psi | 500 | 1330 | 140 | 275 | 210 | 420 |

Samples 2-6 were each cured in a cube mold at 160° F. for 24 hours and the compressive strength determined. From the data in Table 2, it is clear that changing the OWR from 20:80 to 30:70 had a positive effect on the compressive strength of each sample. Improved results were also seen with AIBN as the polymerization initiator. The performance of the three initiators mirrored their reactivity, with AIBN being the most reactive (lowest decomposition half-life) and benzoyl peroxide being the least reactive (highest decomposition half-life).

Example 2

The effect of varying the nature of the monomer on the compressive strength of ERCs of the type disclosed herein was investigated. Three ERC samples, designated samples 7-9, were prepared as disclosed in Table 3.

TABLE 3

| Sample | 7 | 8 | 9 |
|---|---|---|---|
| OWR | 30:70 | 30:70 | 30:70 |
| Methylstyrene, mL | 18 | — | — |
| t-Butylstyrene, mL | — | 18 | — |
| α-methylstyrene, mL | — | — | 18 |
| Divinylbenzene, mL | 18 | 18 | 18 |
| HYERMUR 2296, mL | 6 | 6 | 6 |
| AIBN[1], g | 0.4 | 0.4 | 0.4 |
| 0.5% CaCl$_2$ aq. Solution | 8.75 | 8.75 | 8.75 |
| Water, mL | 52.5 | 52.5 | 52.5 |
| Class A Cement, g | 140 | 140 | 140 |
| Compressive strength, psi | 1310 | 1290[2] | >250 |

[1]azobisisobutyronitrile
[2]Average of three samples

The monomers chosen for investigation had a lower volatility than the styrene monomer. Sample 7 was prepared using methylstyrene, Sample 8 contained t-butylstyrene, and Sample 9 contained α-methylstyrene. Each sample also contained HYPERMER 2296 polymeric surfactant and AIBN. Additional materials present in the samples and the amounts of these materials are given in Table 3. Samples 7-9 were each cured in a cube mold at 160° F. for 24 hours and the compressive strength determined. Results with these alternative monomers summarized in Table 3 show the compressive strength of the samples 7 and 8, prepared with methylstyrene and t-butylstyrene respectively, was comparable to that of an ERC prepared using styrene monomer and having an OWR of 30:70 (see Table 2). Sample 9 prepared with α-methylstyrene had a compressive strength that was lower than either Samples 7 or 8. Without wishing to be limited by theory, the lower compressive strength observed for the sample containing α-methylstyrene as the monomer may be the result of the reduced reactivity of α-methylstyrene as a result of steric hindrance in the molecule around the reactive unsaturation leading to a reduced reaction rate. While the samples containing t-butylstyrene or methylstyrene displayed similar compressive strength t-butylstyrene advantageously displays a reduced volatility and cost when compared to methylstyrene.

Example 3

The effect of varying the nature of the crosslinker on the compressive strength of ERCs of the type disclosed herein was investigated. Four ERC samples, designated samples 10-13, were prepared as disclosed in Table 4.

TABLE 4

| Sample | 10 | 11 | 12 | 13 |
|---|---|---|---|---|
| OWR | 30:70 | 30:70 | 30:70 | 30:70 |
| Styrene, mL | 36 | — | — | — |
| t-Butylstyrene, mL | — | 27 | 27 | 36 |
| Diisopropenylbenzene, mL | 36 | — | — | — |
| Trimethylolpropane triacrylate, mL | — | 9 | — | — |
| Pentaerythritol tetraacrylate, mL | — | — | 9 | — |
| Hypermer 2296, mL | 12 | 6 | 6 | 6 |
| AIBN[1], g | 0.8 | 0.4 | 0.4 | 0.4 |
| 0.5% CaCl$_2$ aq. Solution | 17.5 | 8.75 | 8.75 | 8.75 |
| Water, mL | 105 | 52.5 | 52.5 | 52.5 |
| Class A Cement, g | 280 | 140 | 140 | 140 |
| Compressive strength, psi | 380 | 1470[2] | 1120 | 670 |

[1]azobisisobutyronitrile
[2]Average of three samples

Sample 10 was a comparative sample prepared using styrene monomer and diisopropenylbenzene as the crosslinker. Samples 11 and 12 utilized trimethylolpropane acrylate and pentaerythritol tetraacrylate respectively as the crosslinker while Sample 13 was a control sample which did not contain a crosslinker. Samples 10-13 were each cured in a cube mold at 160° F. for 24 hours and the compressive strength determined. Additional materials present in the samples, the amounts of these materials, and the compressive strengths of the cured samples are given in Table 4.

The data in Table 4 clearly indicates that diisopropenylbenzene is not a suitable cross-linker as Sample 10 showed the lowest compressive strength. Without wishing to be limited by theory, diisopropenylbenzene may react too slowly as samples prepared with this crosslinker showed significant gas entrainment from AIBN decomposition. In contrast, the acrylate cross-linkers used in samples 11 and 12 were effective and represent suitable alternatives to divinylbenzene. Sample 13 did not contain a crosslinker and the compressive strength of this sample was considerably less than that of Samples 10-12 demonstrating that removal of the cross-linker adversely affected the compressive strength.

Example 4

Rheological properties and mud compatibility of ERCs of the type disclosed herein were investigated. Sample 11 was prepared as described in Table 4. The sample was then mixed with ENCORE high-performance isomerized olefin based fluid, which is an oil-based mud, to give samples that contained 5, 10, 15, or 20 volume percent OBM. At room temperature, the rheological properties of Sample 11 in the absence of an OBM or containing 5, 10, 15 or 20 vol. % OBM were measured using a FANN 35 viscometer at 3, 6, 100, 200, 300, and 600 RPM. The viscosity at each mixing speed, plastic viscosity (centipoise) and yield point (lbs/100 ft$^2$) of the samples were also measured in accordance with API Recommended Practices 10B, Bingham Plastic Model and are given in Table 5.

TABLE 5

| | Sample | | | | |
|---|---|---|---|---|---|
| | 0% OBM | 5% OBM | 10% OBM | 15% OBM | 20% OBM |
| Sample 11, vol. % | 100 | 95 | 90 | 85 | 80 |
| ENCORE, vol. % | 0 | 5 | 10 | 15 | 20 |
| Fann 35 Rheology at 120° F. | | | | | |
| Plastic Viscosity, cP | 133 | 119 | 111 | 102 | 97 |
| Yield Point, lb/100 ft$^2$ | 96 | 45 | 41 | 45 | 40 |
| 600 rpm | 362[1] | 283 | 263 | 249 | 234 |
| 300 rpm | 229 | 164 | 152 | 147 | 137 |
| 200 rpm | 174 | 120 | 112 | 106 | 97 |
| 100 rpm | 110 | 69 | 63 | 58.5 | 54 |
| 6 rpm | 22 | 9.5 | 8.5 | 8 | 7.5 |
| 3 rpm | 16.5 | 7 | 6 | 6 | 5.5 |
| Compressive Strength, psi | 1470[2] | 1300 | 1200 | 675 | 350 |

[1]Estimated using a Hydraulics Modeling Program.
[2]Average of three samples.

The neat ERC sample (i.e., Sample 11) displayed a fairly high rheological profile. The sample was not exceedingly thick and the addition of OBM clearly had a beneficial thinning/dilution effect. The compressive strengths of the samples showed a steady decrease as the volume percent of mud increased; however even at 15% OBM the samples still displayed an appreciable compressive strength which exceeded the minimum expectation for compressive strength.

The ERCs disclosed herein are oil-compatible cement-like materials suitable for lost circulation applications. The disclosed compositions contain additives appropriate for field use and should offer performance advantages of traditional cement when used in wells drilled with oil-based mud.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising:
placing an emulsified resin composition into a fluid loss zone of the wellbore, wherein the emulsified resin composition comprises (1) a nonaqueous external phase (NEP) comprising (i) a polymerizable material, (ii) a crosslinker, (iii) an emulsifier in an amount of from about 1 vol. % to about 20 vol. % based on the total volume of the NEP and (iv) an optional initiator and (2) an aqueous internal phase (AIP) comprising cementitious material and water; and
allowing the composition to cure to form a composite material.

2. The method of claim 1 wherein the polymerizable material comprises a vinyl aromatic monomer.

3. The method of claim 1 wherein the polymerizable material has a boiling point greater than about 150° F. and a flash point greater than about 110° F.

4. The method of claim 1 wherein the polymerizable material comprises substituted styrene, ring-substituted styrene or combinations thereof.

5. The method of claim 1 wherein the polymerizable material is present in an amount of from about 20 vol. % to about 60 vol. % based on the total volume of the NEP.

6. The method of claim 1 wherein the crosslinker has a boiling point greater than about 150° F. and a flash point greater than about 110° F.

7. The method of claim 1 wherein the polymerizable material is characterized by the general structure:

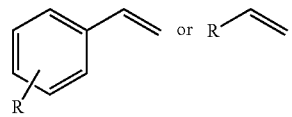

where R is an alkyl group, an aryl group, an alkenyl group, a halide group, an —OR group, an —NR$_2$ group, or a —PR$_2$ group.

8. The method of claim 1 wherein the crosslinker comprises diisopropylbenzene, trimethyolpropane triacrylate, pentaerythritol tetraacrylate, or combinations thereof.

9. The method of claim 1 wherein the crosslinker is present in the NEP in an amount of from 0.1 mol. % to about 5 mol. % based on the total moles of polymerizable groups.

10. The method of claim 1 wherein the optional initiator comprises organic peroxides, azo-initiators, diacyl peroxides, peroxydicarbonates, monoperoxycarbonates, peroxyketals, peroxyesters, dialkyl peroxides, hydroperoxides, or combinations thereof.

11. The method of claim 1 wherein the optional initiator is present in the NEP in an amount of from about 0.05 mol. % to about 5 mol. % based on the total moles of polymerizable groups.

12. The method of claim 1 wherein the emulsifier comprises an anionic or non-ionic surfactant.

13. The method of claim 1 wherein the cementitious material comprises hydraulic cement comprising calcium, aluminum, silicon, oxygen, and/or sulfur.

14. The method of claim 1 wherein the cementitious material is present in the AIP in an amount of from about 60 wt. % to about 99 wt. % based on the total weight of the AIP.

15. The method of claim 1 wherein water is present in an amount of from about 20 wt. % to about 40 wt. % based on weight of the cementitious material.

16. The method of claim 1 wherein the emulsified resin composite has an oil:water ratio of from about 5:95 to about 50:50.

17. The method of claim 1 wherein the composite material has a compressive strength of from about 200 psi to about 2500 psi.

18. The method of claim 1 wherein the area of loss circulation is substantially oil-wet.

19. The method of claim 1 wherein the polymerizable material resists degradation in a temperature range of from about 80° C. to about 350° C.

20. The method of claim 1 wherein the NEP has a reaction time of from about 4 hours to about 18 hours.

21. The method of claim 1 wherein the AIP has a reaction time of from about 12 hours to about 24 hours.